United States Patent [19]

Kusakawa et al.

[11] Patent Number: 4,595,459
[45] Date of Patent: Jun. 17, 1986

[54] DESALINIZATION APPARATUS

[75] Inventors: Hideaki Kusakawa; Junjiro Kai, both of Hyogo, Japan

[73] Assignee: Mitsubishi Denki Kabushiki Kaisha, Tokyo, Japan

[21] Appl. No.: 441,002

[22] Filed: Nov. 12, 1982

[51] Int. Cl.$^4$ .......................... B01D 3/34; C02F 1/04
[52] U.S. Cl. ..................... 202/177; 202/180; 202/234; 159/16.1; 203/10; 203/22; 203/25; 203/49; 203/DIG. 1
[58] Field of Search .............. 202/173, 174, 177, 180, 202/234; 203/49, 73, 22, 25, 10, 11, DIG. 17, DIG. 1, 100; 159/2 R, 2 MS, DIG. 8, 16.1

[56] References Cited

U.S. PATENT DOCUMENTS

| | | | |
|---|---|---|---|
| 2,902,414 | 9/1959 | Schmerzler | 203/49 |
| 3,206,379 | 9/1965 | Hill | 203/49 |
| 3,243,358 | 3/1966 | McCue | 202/173 |
| 3,257,291 | 6/1966 | Gerber | 203/49 |
| 3,284,318 | 11/1966 | Coanda et al. | 203/49 |
| 3,317,406 | 5/1967 | Beard | 203/49 |
| 3,345,272 | 10/1967 | Collins | 203/49 |
| 3,398,059 | 8/1968 | Cane et al. | 203/173 |
| 3,457,144 | 7/1969 | Silver | 202/173 |
| 3,522,151 | 7/1970 | Dismore | 203/49 |
| 3,843,463 | 10/1974 | Brown | 203/49 |
| 3,852,162 | 12/1974 | Light | 203/49 |
| 3,860,492 | 1/1975 | Lowi et al. | 203/49 |
| 4,200,497 | 4/1980 | Rhodes | 203/49 |
| 4,210,494 | 7/1980 | Rhodes | 203/49 |
| 4,276,124 | 6/1981 | Mock | 203/49 |

FOREIGN PATENT DOCUMENTS

| | | |
|---|---|---|
| 768099 | 6/1971 | Belgium . |
| 1096880 | 6/1955 | France . |
| 2250708 | 1/1975 | France . |

*Primary Examiner*—Wilbur Bascomb
*Attorney, Agent, or Firm*—Sughrue, Mion, Zinn Macpeak & Seas

[57] ABSTRACT

A desalinization apparatus includes a section for heating up input saline water using the heat released in subsequent water vapor condensation. A solar heater may be used to raise the saline water to a proper evaporation temperature, and a carrier gas is used as a vehicle for transporting water vapor from evaporation to condensation sections.

8 Claims, 4 Drawing Figures

KEY
101 : CONDENSATION SECTION
201 : EVAPORATION SECTION
31 : WARM-UP SECTION

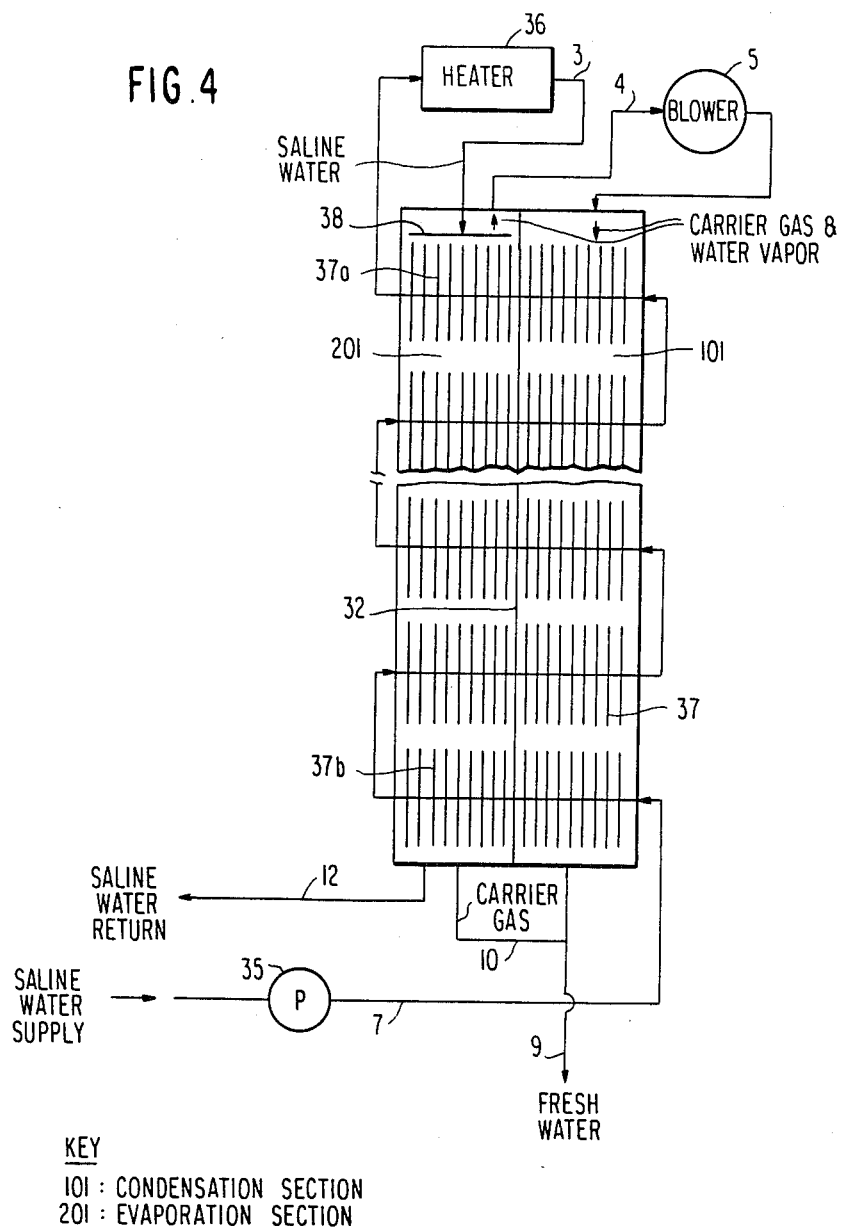

DESALINIZATION APPARATUS

BACKGROUND OF THE INVENTION

The present invention relates to a new desalinization apparatus for obtaining potable water, irrigation water or industrial use water from saline water such as seawater. More particularly, the invention relates to a desalinization apparatus which reduces energy requirements by using the latent heat of condensation of water vapor in the evaporation of the saline water.

Many desalinization apparatuses have been produced, and a number of them are being used commercially. The key factor in these apparatuses is to produce a maximum amount of potable water with a minimum of energy input. Desalinization is conventionally effected either by making use of a temperature-dependent change in phase such as evaporation or freezing or by the application of pressure such as in reverse osmosis. The former methods involve the release of latent heat, and, in particular, the latent heat of evaporation is as great as 540 cal. per gram of water, and must be recovered to increase the heat utilization efficiency of the desalinization operation. The change in phase occurs at a fixed temperature for a constant pressure, so recovery of the latent heat must always be accompanied by a change in pressure.

Saline water can also be desalinized by multi-stage flashing, wherein the temperature and pressure of the saline water to be evaporated are increased by heating and the pressure is then reduced to atmosphere so as to evaporate the saline water and condense water vapor. Since this method recovers part of the latent heat of evaporation in the water vapor, it has the highest efficiency of heat utilization and is currently in wide use. But this method has one serious defect: to achieve more efficient use of the heat, no gas (such as air) should be present in the saline water to be evaporated and thus degasification is necessary before elevating the temperature and pressure. Multi-stage flashing has this drawback since it is effected in an airtight system under pressure.

SUMMARY OF THE INVENTION

One object of the present invention is to provide an improved desalinization apparatus, with particularly high heat efficiency.

Another object of the present invention is to provide a desalinization apparatus including a section for heating saline water, a tank for evaporating the saline water passed through the heating section, a tank for condensing water vapor, a first pipe for directing the water from the evaporation tank to the condensation tank together with a carrier gas, and a second pipe for directing the carrier gas to the evaporation tank after being freed of water vapor, which is condensed in the condensation tank.

In the desalinization apparatus of the present invention, the condensation and evaporation tanks are connected by a pipe at the top thereof, and the apparatus further includes means for heating the saline water being transferred from the condensation tank to the evaporation tank, means for transporting to the condensation tank the carrier gas obtained in the evaporation tank and which carries saturated water vapor pressure, and means provided in the condensation tank for cooling the carrier gas having the saturated water vapor pressure. By using this configuration, the above described defects of the conventional apparatus, i.e. the need of degasification of the saline water and the very low heat efficiency at atmospheric pressure due to the failure to recover the latent heat of evaporation, are eliminated.

The evaporation tank of the apparatus of the present invention has a temperature distribution such that the saline water becomes hotter as it moves up (a phenomenon quite contrary to what usually takes place in a distillation column), so that the saturated water vapor pressure is increased with temperature, and provides a carrier gas having a very high absolute humidity. The resulting carrier gas is introduced in the condensation tank where it is subjected to heat exchange with the saline water as it releases the latent heat of condensation through a condensation pipe in the tank until the water is condensed from the carrier gas. Therefore, the apparatus of the present invention is advantageous in that it is capable of recovering the latent heat of the water vapor with high efficiency to achieve an attendant remarkable increase in the overall heat efficiency.

In the desalinization apparatus of the present invention, the condensation and evaporation tanks may be connected by a single pipe on their top so that the saline water overflows from the condensation tank into the evaporation tank and the carrier gas having the saturated water vapor pressure is transported through the condensation pipe (to be described later) in the condensation tank. But to prevent entrainment of the saline water in the carrier gas, the two tanks are preferably connected on their top by two pipes, one providing a passage for overflow of the saline water from the condensation tank to the evaporation tank and the other providing a passage for transporting the carrier gas (which has been produced in the evaporation tank and includes water vapor) through the condensation pipe in the condensation tank.

In the apparatus of the present invention, the saline water transferred from the condensation tank to the evaporation tank may be heated by a heat source such as a solar collector, an electric heater or a boiler which makes up for the heat loss due to heat dissipation from the apparatus. The heat source may be placed, for example, on top of the condensation or evaporation tank, but for ease in heating the saline water, the heat source is preferably installed within the pipe connecting the two tanks (or the first pipe for introducing the saline water when the tanks are connected by two pipes). The carrier gas obtained in the evaporation tank and which has the saturated water vapor pressure can be transported to the condensation tank by a blower pump which causes the carrier gas to be transported from the top of the evaporation tank into the condensation pipe (to be described later) in the condensation tank. After releasing water vapor in the condensation pipe, the carrier gas is recycled from the bottom of the condensation tank to that of the evaporation tank via a carrier gas recycling pipe. The blower pump for transporting the carrier gas is connected to the pipe between the condensation and evaporation tanks (or the second pipe for transporting the carrier gas when the tanks are connected by two pipes) and the condensation pipe in the condensation tank so that the carrier gas is recycled from the top of the evaporation tank to the bottom of the evaporation tank through the condensation pipe and the carrier gas recycling pipe. Alternatively, the blower pump may be installed within the carrier gas recycling pipe to achieve the same object. The carrier gas with the saturated water vapor pressure being transported from the evaporation tank is cooled as it flows within the condensation pipe installed in the condensation tank. As a result of the temperature drop, the water vapor is condensed out of the carrier gas to form a dew of fresh water on the inner walls of the condensation pipe, and at the same time, the sensible heat and latent heat of the water vapor are released to the saline water in the condensation tank to increase its temperature as it moves along to the evaporation tank. In this case, sets of condensation and evaporation tanks may be interconnected to reduce heat loss due to the heat dissipation from the apparatus, which is very advantageous for the purposes of the present invention.

In the apparatus of the present invention, a tank which has incorporated therein a condensation pipe equipped with, say, heat dissipation plates to achieve smooth heat exchange is used as the condensation tank, and a tank having the same configuration as that of a conventional packed column or distillation column is used as the evaporation tank.

The bottom of the condensation pipe in the condensation tank is connected to the bottom of the evaporation tank by a pipe through which the carrier gas is recycled to the evaporation tank.

In the desalinization apparatus of the present invention, having the configuration described above, the carrier gas obtained in the evaporation tank and which has the saturated water vapor pressure is forced by the blower pump to be transported from the top of the evaporation tank to the top of the condensation pipe in the condensation tank through the interconnecting pipe (or the pipe for transporting the carrier gas when the two tanks are connected by two pipes), and as the carrier gas is forced down the condensation pipe, it is cooled to release the water vapor. After freeing the water vapor, the carrier gas is transported from the bottom of the condensation tank to the bottom of the evaporation tank through the carrier gas recycling pipe, and in the evaporation tank, the carrier gas is resaturated with water vapor and recycled to the condensation pipe as a gas having a saturated water vapor pressure.

The apparatus of the present invention may use air as the carrier gas, so it does not have to be degasified as in the multi-flashing method, and filtered seawater can be immediately used as a feedstock. Furthermore, the apparatus has a high efficiency of heat utilization, so a solar collector having a small receiving area can be used as a heat source, which is of particular advantage in industrial applications.

A further object of the present invention is to provide a desalinization apparatus wherein the heat generated in the condensation section is transferred to the evaporation section through a heat exchanger so as to increase the recovery rate of such heat and the overall efficiency of heat utilization, which leads to a reduction in the size of the apparatus and an increase in the desalinization efficiency. This object can be achieved by a desalinization apparatus comprising a condensation section and an evaporation section separated by a partition, the evaporation section to which the saline water is fed being equipped with a saline water heating section and a saline water dischange pipe, and the condensation section being equipped with a fresh water exit, the evaporation and condensation sections being connected by a pipe through which a carrier gas is recycled, the partition serving as a medium for heat transfer from the condensation section to the evaporation section.

The desalinization apparatus of the present invention has been accomplished on the basis of the new finding that if the heat generated in the condensation section is transferred to the evaporation section, a desired higher efficiency can be attained and overall heat utilization can be enhanced by simply changing the volume of the carrier as flowing in the system. The apparatus is capable of achieving a higher desalinization efficiency than the conventional products, and, at the same time, the size of the apparatus can be reduced.

BRIEF DESCRIPTION OF THE DRAWINGS

FIG. 4 is a schematic longitudinal section of the desalinization apparatus of the present invention according to still another embodiment.

DETAILED DESCRIPTION OF THE PREFERRED EMBODIMENTS

Figure 1:
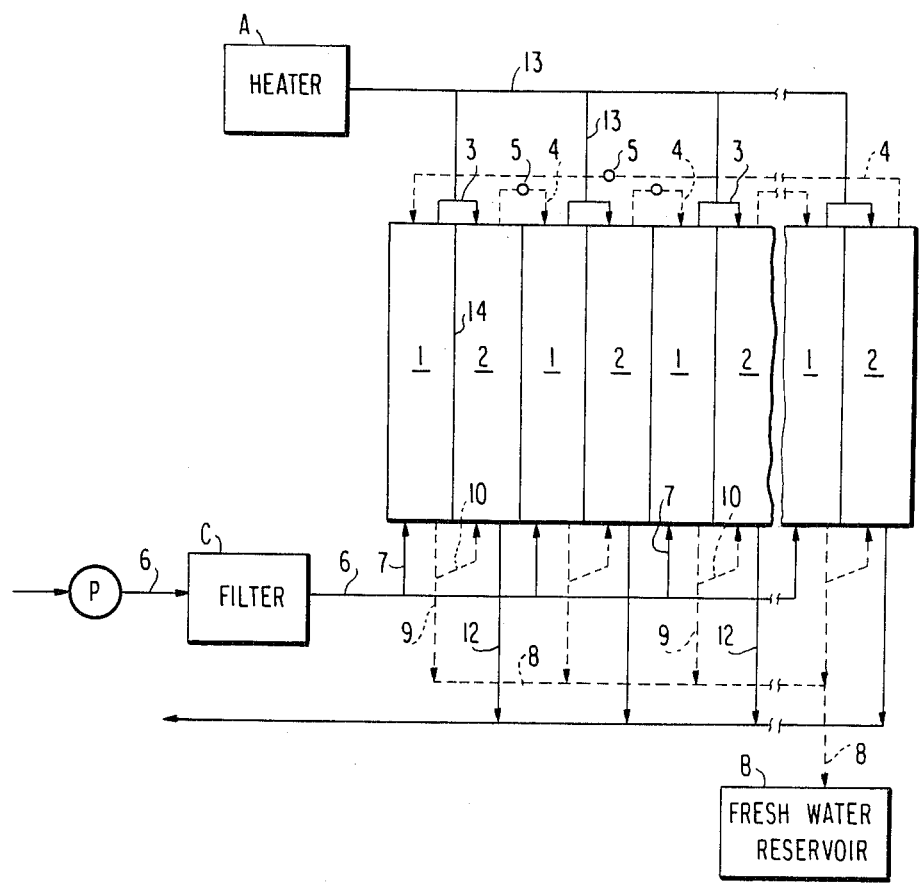
FIG. 1 is a block diagram showing one embodiment of the desalinization apparatus of the present invention.

FIG. 1 is a block diagram of the desalinization apparatus according to one embodiment of the present invention wherein pairs of condensation and evaporation tanks are arranged side by side. Partitions, one of which is depicted by the numeral 14 separate the evaporation sections from the condensation sections. In FIG. 1, the numeral 1 indicates condensation tanks, at 2 are evaporation tanks, and at 3 are pipes connecting condensation tanks 1 and evaporation tanks 2, through which saline water is supplied. Another set of pipes 4 connect the two tanks and carry the carrier gas, and blower pumps 5 are arranged therein. A main pipe 6 supplies the saline water, and at 7 are pipes for supplying the saline water to condensation tanks 1. Fresh water is recovered through main pipe 8, and at 9 are pipes through which fresh water is recovered from each condensation tank 1. A carrier gas recycling pipe 10, a main saline water discharge pipe 11, pipes 12 through which the saline water is dischanged from each evaporation tank 2, and a heat pipe 13 (i.e. a heat source) complete the piping network. Further in FIG. 1, at A is a solar collector, and at B is a fresh water reservoir. A saline water filter C and a saline water feed pump P complete the arrangement.

Saline water from pump P flows through main pipe 6, is filtered at C and enters condensation tanks 1 through pipes 7. The saline water is forced up the condensation tank 1 and is subjected to heat exchange on the inner wall of the condensation pipe (not shown) in the condensation tank 1 with a carrier gas being supplied to the condensation tanks 1 (or the condensation pipes) from the top of evaporation tanks 2 by means of blower pumps 5. The heated saline water enters evaporation tank 2 after being heated in pipes 3 by heat pipe 13 connected to solar collector A. The heated saline water moves down into evaporation tanks 2 and imparts water vapor to the carrier gas transferred from the bottom of the condensation pipes to the evaporation tanks 2 through recycling pipes 10, and thereafter, the saline water is discharged from each evaporation tanks 2 through pipes 12 and main pipe 11.

The carrier gas introduced in condensation tanks 1 by blower pumps 5 is forced down the condensation pipe, enters the bottom of an evaporation tank 2 through a recycling pipe 10, and is there heated to become a carrier gas having the saturated water vapor pressure due to gas-liquid equilibrium and is transported to the condensation pipe in the adjacent condensation tank 1 through pipe 4. The carrier gas is then forced down the condensation pipe as it imparts its sensible and latent heats to the saline water on the pipe wall and releases an amount of water vapor corresponding to the difference in temperature of the saline water. After releasing the water vapor, the carrier gas is transported to the bottom of evaporation tank 2 through recycling pipes 10. The fresh water collected in the condensation pipes in condensation tanks 1 is recovered therefrom through pipes 9 and main pipe 8 and is stored in reservoir B.

An experiment was conducted to desalinize seawater by operating the apparatus of the present invention under the conditions listed in Table 1.

TABLE 1

| Conditions on the basis of which the energy utilization efficiency was calculated. | |
|---|---|
| Ambient temperature | 30° C. |
| Pressure | 1 atm |
| Temperature of seawater | 25° C. |
| Solar collector heated to | 90° C. |
| Amount of fresh water | 100 t/hr max. |
| Solar heat received | 860 Kcal/h · m² |
| Specific heat of air at const. press. | 70 cal/mol |
| Specific heat of seawater | 1 cal/g |
| Latent heat of evaporation of water | 540 cal/g |
| Density of seawater and water | 1 g/cc |

RESULTS (1) Start-up

The seawater in one condensation tank was heated to a predetermined temperature and sent to a paired evaporation tank. When the seawater began to flow to the bottom of the evaporation tank, a predetermined amount of carrier gas (air) was pumped to the evaporation tank, as well as to its paired condensation tank, and the temperature of the seawater was elevated as the carrier gas (having the saturated water vapor pressure for the temperature at the top of the evaporation tank) was cooled. The operation became steady when the overall system (including all the condensation and evaporation tanks) reached predetermined temperatures.

(2) Steady-state operation and the calculation of heat utilization

A system comprising one set of condensation and evaporation tanks will be considered on the assumption that the condensation tank is fed with 54 g of seawater (25° C.) per hour, the temperature of the seawater at the top of the condensation tank after heat exchange being 85° C. The amount of heat ($Q_1$) necessary to raise the temperature from 25° C. to 85° C. is:

$$Q_1 = 54 \text{ (cal/°C. hr)} \times 60 \text{ (°C.)} = 3240 \text{ cal/hr.}$$

If it is assumed that this amount of heat is supplied in the form of the latent heat of condensation, 6 g/hr of water is necessary. If 6 g of water is contained in the carrier gas (90° C.) at the saturated water vapor pressure, the amount of air ($V_{90° C.}$), assuming that the vapor pressure, of water at that temperature (90° C.) is 526 mmHg, is:

$$V_{90° C.} = 29 \text{ (apparent molecular weight of air)} \times (6/18) \times (234/526) = 4.3 \text{ g/hr.}$$

The volume of 4.3 g of air when it is fed to the evaporation tank at 30° C. ($V_{30° C.}$) is:

$$V_{30° C.} = (4.3/29) \times R \text{ (gas constant)} \times 303$$
$$= 4.3 \times 0.082 \times 303/29 = 3.7 \text{ l/hr.}$$

The volume of the carrier gas when it enters the condensation tank ($V_{90° C.}$) is:

$$V_{90° C.} = (10.3/21.4) \times 0.082 \times 363 = 14.3 \text{ l/hr,}$$

wherein 10.3 is the sum of the water vapor (6 g) and air (4.3 g), and 21.4 is the average molecular weight of air having the saturated water vapor pressure for 90° C. [$29 \times (234/760) + 18 \times (526/760)$]. The amount of heat ($Q_2$) necessary for elevating the temperature of the seawater from 85° C. to 90° C. is:

$$Q_2 = 54 \times 5 = 270 \text{ cal/hr.}$$

The system performance ratio ($\gamma$) (the amount of fresh water (1b) obtained for 1000 BTU of heat input) is:

$$\gamma = [(6/453)/(270/252)] \times 1000 \approx 12.2$$

Therefore, to recover 100 tons of freshwater per hour, the values shown above must be multiplied by the factor $16.7 \times 10^6$ [$(100 \times 10^6)/6 = 16.7 \times 10^6$], and the following data is obtained:

| | |
|---|---|
| Seawater pumped: | $54 \times 16.7 \times 10^6 = 902$ t/hr |
| Carrier air: | $4.3 \times 16.7 \times 10^6 = 72$ t/hr |
| Volume of carrier air (30° C.): | $3.7 \times 16.7 \times 10^6 = 62,000$ m³/hr |
| Volume of carrier air sent to the condensation tank (90° C.): | $14.3 \times 16.7 \times 10^6 = 239,000$ m³/hr |
| Heat requirements: | $270 \times 16.7 \times 10^6 = 4,510,000$ Kcal/hr |
| Receiving area of solar collector: | $4,510,000/860 = 5250$ m² |

Figure 2:
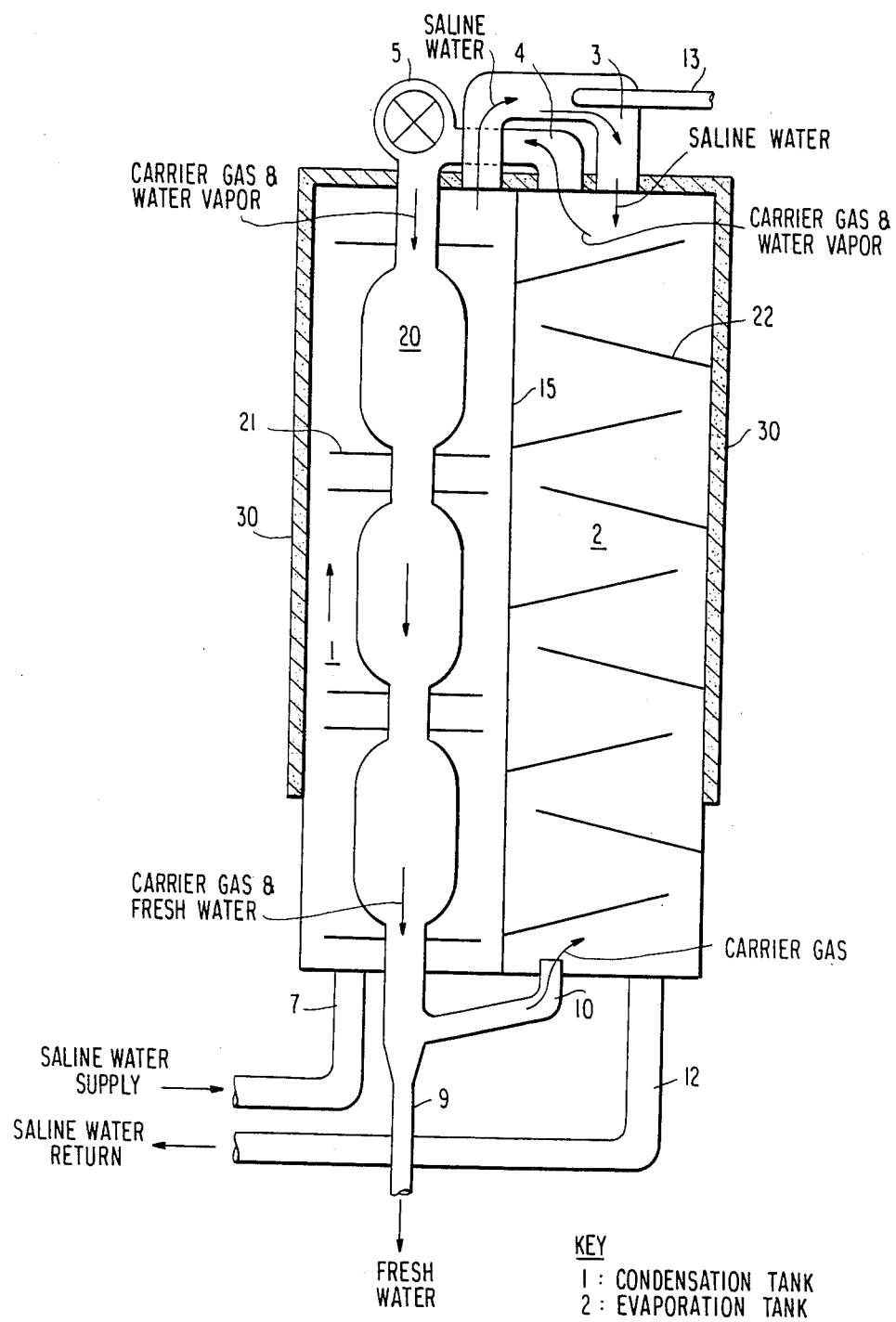
FIG. 2 is a schematic representation of the desalinization apparatus of the present invention shown in FIG. 1.

FIG. 2 is a schematic representation of the embo of FIG. 1. FIG. 2, the numeral 1 indicates a condensation tank, 2 is an evaporation tank, 3 is a pipe for connecting condensation tank 1 and evaporation -tank 2 through which saline water is supplied, and 4 is another pipe for connecting the two tanks, but through which the carrier gas flows. A partition 15 separates the evaporation section from the condensation section. At 5 is shown a blower pump, 7 is a pipe for supplying the saline water to condensation tank 1, 9 is a pipe through which fresh water is recovered from condensation tank 1, 10 is a carrier gas recycling pipe, 12 is a pipe through which the saline water is discharged from evaporation tank 2, 13 is a heat pipe, and 20 is a condensation pipe installed in condensation tank 1. Shown at 21 is a heat dissipation plate, 22 is a wetting plate installed in evaporation tank 2, and 30 is a heat insulator around condensation tank 1 and evaporation tank 2. In the embodiment of FIG. 2, blower pump 5 is connected to pipe 4 and condensation pipe 20 in such a manner that the carrier gas is transported from the top of the evaporation tank 1 into condensation pipe 20 (namely, the carrier gas is transported from the bottom of condensation pipe 20 to the bottom of evaporation tank 2 through recycling pipe 10).

First, seawater with a temperature of 25° C. enters condensation tank 1 through feed pipe 7 and is forced up through condensation tank 1 as it is subjected to heat exchange with the carrier gas having the saturated water vapor pressure and which goes down condensation pipe 20 (assuming that the seawater on the topmost part of condensation pipe 20 has a temperature of 85° C.). The seawater reaching the topmost part of condensation pipe 20 is heated to 90° C. by the heat pipe 13 in saline water supply pipe 3 (assuming that solar collector A (high heat source) of FIG. 1 heats the seawater to 95° C.), and the heated seawater is fed through pipe 3 to evaporation tank 2 which has the same construction as that of a packed column or distillation column. The seawater in evaporation tank 2 imparts water vapor to and raises the temperature of carrier air (which is being forced upward through evaporation tank 2 by blower pump 5) by the wetted wall principle, while at the same time, the temperature of the seawater is gradually decreased as it moves to the bottom of evaporation tank 2. When the temperature of the seawater is 30° C., the carrier air contains the amount of water vapor that corresponds to the saturated vapor for 30° C., so the temperature of the seawater will not become lower than 30° C. Any seawater that has become lower than 30° C. is discharged from the system via discharge pipe 12. In this case, if a more-than-necessary amount of carrier air is supplied to evaporation tank 2, heat loss occurs since the heat energy is spent in elevating the temperature of air, and if a less-than-necessary amount of carrier air is supplied, heat recovery from condensation tank 1 is not satisfactory and the recovery rate of fresh water is decreased.

The carrier air is recycled in the following manner. Having the saturated water vapor pressure for 30° C., the carrier air first enters evaporation tank 2 from the bottom through recycling pipe 10, and while maintaining the gas-liquid equilibrium with the heated seawater coming down evaporation tank 2, the carrier air is heated and moves to the top of evaporation tank 2. At the top of evaporation tank 2, the temperature of the carrier air is about 90° C. and it has the saturated water vapor pressure for that temperature. When the carrier having such saturated water vapor pressure is directed to condensation pipe 20 by blower pump 5, a negative pressure is created in the top of evaporation tank 2 and the evaporation of water vapor is further accelerated. As it passes through condensation pipe 20, the carrier air having the described saturated water vapor pressure imparts its sensible heat to the seawater, and as a result, its dew point is decreased and water vapor condenses on the walls of condensation pipe 20, releasing the latent heat. Condensed tiny water drops move downward by gravity and collect in a fresh water reservoir (reservoir B in FIG. 1) through recovery pipe 9. After heat exchange with the seawater, the carrier air has a temperature of 30° C. and is again supplied to evaporation tank 2 through recycling pipe 10, to complete the seawater/fresh water conversion, carrier air recycling cycle.

Figure 3:
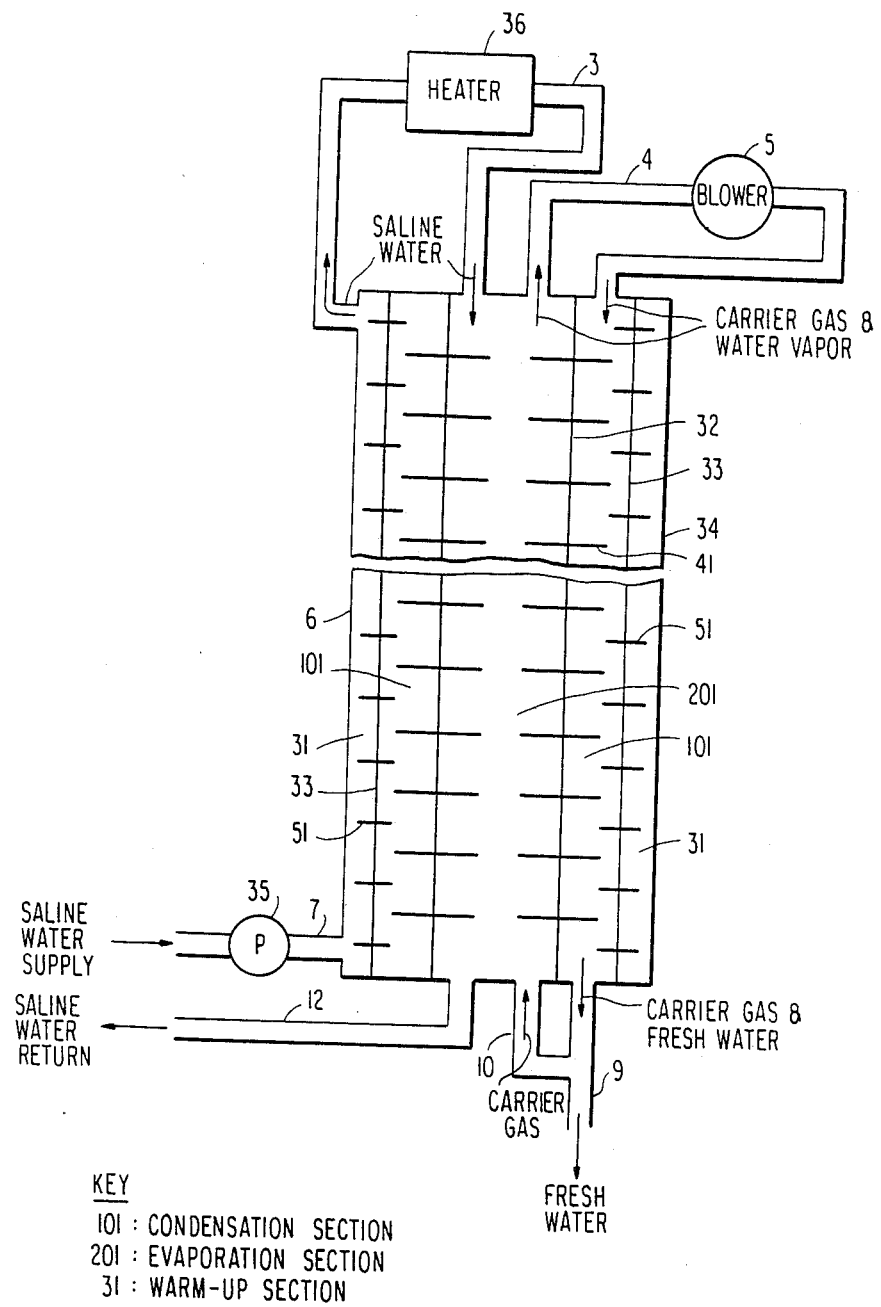
FIG. 3 is a schematic longitudinal section of the desalinization apparatus of the present invention according to another embodiment.

FIG. 3 is a schematic longitudinal section showing another embodiment of the apparatus of the present invention. FIG. 4 is a schematic longitudinal section showing still another embodiment of the apparatus. The apparatus shown in FIG. 3 is one of relatively small scale or laboratory scale suitable for producing about one liter of fresh water per hour, and the apparatus of FIG. 4 is one of relatively large scale adapted to produce several tons of fresh water per day.

In FIG. 3, the numeral 201 indicates an evaporation section, 101 is a condensation section, and 31 is an auxiliary section for warming up saline water. The apparatus comprising evaporation section 201, condensation section 101 and saline water warm-up section 31 has cylindrical form and these sections are separated by partitions 32 and 33 made of a material which is resistant to the corrosive effect of saline water and which is highly heat-conductive (e.g. corrosion-resistant aluminum plate). These partitions are equipped with heat-exchanging fins 41, 51, respectively. The outer wall 34 of the apparatus is surrounded by a heat-insulating material that provides heat insulation from the external atmosphere.

Saline water feed is first passed through a filter (not shown) to remove suspended solids and is sent to warm-up section 31 by a pump 35 through feed pipe 7. The heat released in condensing section 101 is transferred to warm-up section 31 through partition 33, and fins 51 attached to said partition and is used to heat the saline water. The heated saline water exits out of the top of warm-up section 31 and enters a saline water heating section 36 where it is heated to a predetermined temperature before being fed to evaporation section 201 through saline water supply pipe 3.

In evaporation section 201, the saline water contacts the ascending carrier gas, which carries away the water vapor and thermal energy. The saline water wets partition 32 and fins 41 and forms a film (of saline water) on these surfaces as it trickles down in drops. The saline water that has reached the bottom of evaporation section 201 is immediately discarded through discharge pipe 12, but depending on the temperature of the saline water, it may be discarded after heat exchange with the saline water feed by a liquid-liquid type heat exchanger (not shown).

As mentioned before, the carrier gas (usually air, but other gases such as nitrogen may also be used) is introduced to evaporation section 201 from the bottom, and in that section it contacts the saline water and removes the water vapor and thermal energy therefrom. Thus, at the top of evaporation section 201, the carrier gas has been elevated to a temperature close to that of the surrounding saline water and has a water vapor pressure close to the saturated level. The carrier gas having such water vapor pressure is forced into condensation section 101 by blower 5 through recycling pipe 4, and as it descends in condensation section 101, its temperature is decreased to condense the super saturated water vapor and release heat. The carrier gas reaching the bottom of condensation section 101 is again sent to evaporation section 201 through recycling pipe 10 branched from fresh water exit 9, and by repeating the above procedure, the carrier gas is circulated between evaporation section 201 and condensation section 101.

The heat released as a result of condensation of water vapor in condensation section 101 is recovered by means of partitions 32, 33 and fins 41, 51, and the heat recovered by partition 33 and fins 51 is transferred to saline water warm-up section 31 and converted to sensible heat whereas the heat recovered by partition 32 and fins 41 is transferred to evaporation section 201 and converted to the latent heat of evaporation.

As described above, the desalinization apparatus of this embodiment comprises an evaporation section and a condensation section, and if necessary a saline water warm-up section 31. Since partitions 32 and 33, as well as fins 41 and 51 attached to partitions 32 and 33, respectively permit substantially free transfer of heat between sections, both the heat recovery rate and the efficiency of heat utilization are remarkably improved. As a result, by changing the amount of carrier gas circulating through the system, a desired desalinization rate (the amount of fresh water with respect to saline water feed) can be achieved, and a maximum of 40% is obtainable. Therefore, the apparatus of the invention can be made smaller than the conventional product.

A solar collector, electric heater, boiler or the like can be used as the saline water heating section 36, but a solar collector is preferred. The heating section 36 increases the temperature of the saline water (which has already been heated to some extent by warm-up section 31) close to a level necessary for evaporation and makes up for any heat loss that has occurred on account of, say, heat dissipation from the apparatus.

Fins 41 have the function of transferring, together with partition wall 32, the heat generated in condensation section 101 to evaporation section 201 so as to impart the latent heat of evaporation to the saline water. Therefore, the total surface area of fins 41 is preferably designed to be large enough to improve the heat recovery rate. The total surface area of fins 41 can be increased by increasing the surface area of each fin 41 and by attaching a maximum number of fins 41 on the partition 32. Then saline water is showered from the top of evaporation section 201, a film of saline water is formed on partition 32 and fins 41, and the larger the total surface area of the fins, the greater the latent heat of evaporation applied to the film of saline water and the more water vapor produced. The same can be said of fins 51, and it will be advantageous in heating the saline water if they have a sufficiently large total surface area.

Not only fins 41, and 51, but also various fillers or other types of heat exchangers can be used with advantage in the present invention if they are capable of transferring heat from condensation section 101 to evaporation section 201 and, if necessary, to warm-up section 31, and if they provide an adequately large area of contact with the saline water. It is to be noted that fins 41 and 51, as well as fillers or heat exchangers may be omitted if partitions 32 and 33 are made of a material capable of efficient heat exchange.

FIG. 4 shows an embodiment of the apparatus of the present invention suitable for producing several tons of fresh water per day, and in this embodiment, saline water warm-up section 31 and fins 41 and 51 are replaced by heat exchangers 37, each of which communicates with evaporation section 201 and condensation section 101 through a partition 32.

The heat exchangers 37 are stacked in a tier and use saline water as a heat transfer medium. The bottom heat exchanger 37 is supplied with a saline water feed by pump 35 through feed pipe 7, and the saline water moves up through the higher exchangers 37 and reaches a saline water heating section 36 through the top exchanger 37. The saline water as a heat transfer medium receives the heat generated in condensation section 101 and liberates part of that heat in evaporation section 201. Repeating this heat exchanging action passing through each heat exchanger, the saline water itself is heated, and in heating section 36 it is heated to the temperature necessary for evaporation and is thereafter supplied through feed pipe 3 to evaporation section 201 from the top thereof.

The saline water sprinkled in evaporation section 201 by sprinkling means 38 forms a film of saline water on the surface of each heat exchanger 37 and partition 32, and absorbs the heat generated in condensation section 101 and uses it as the latent heat of evaporation. The water vapor produced in evaporation section 201 is forced by blower 5 and transported by the carrier gas to condensation section 101 together with its thermal energy. In condensation section 101, the carrier gas having the saturated water vapor pressure moves downward as it is cooled by transferring heat to the partition 32 and heat exchangers 37. As a result, the temperature of the carrier gas is reduced to its dew point and water vapor condenses on the heat exchangers 37 and partition 32 to impart heat thereto. The condensed water vapor trickles down in drops and is discharged from the system through exit 9.

According to the present invention, the saline water preheated in heating section 36 may be used as a heat transfer medium passing through the top heat exchanger 37a in evaporation section 201 and may be returned to heating section 36 through a circulation circuit. Since the saline water flowing through the top heat exchanger 37a has been heated to an extremely high temperature, this modification is effective in promoting evaporation of the saline water and increasing the recovery rate of fresh water.

Alternatively, part of the saline water feed may be used as a heat transfer medium passing through the bottom heat exchanger 37b and, at a suitable position, part of the saline water that has been heated in that heat exchanger 37b may be combined with other saline water being sent to evaporation section 201. This method is effective in increasing the heat recovery rate.

What is claimed is:

1. A desalinization apparatus, comprising; a section for elevating the temperature of saline water, a section for heating the saline water that has passed through said temperature elevating section, a section for evaporating the saline water that has passed through said heating section, a section for condensing water vapor, first means for directing the water vapor in said evaporation section to said condensation section together with a carrier gas, second means for directing the carrier gas to said evaporation section after the condensation of water vapor in said condensation section, and means for transferring the heat generated by the condensation of water from said condensation section to at least said evaporation section, wherein the condensation section is separated from the evaporation section by a partition, and the condensation section is also separated from the temperature elevating section by a partition, the heat generated in said condensation section by condensation of water vapor being transferred from said condensation section to said evaporation section and said temperature elevating section through said partitions, and wherein said evaporation, condensation and temperature elevating sections are arranged concentrically with the evaporation section located in the interior, the condensation section located exterior to and around said evaporation section and said temperature elevating section located exterior to and around said condensation section.

2. An apparatus according to claim 1, said first means comprising conduit means connecting said evaporation and condensation sections, and including blower means therein.

3. An apparatus according to claim 1, further including means for forcing carrier gas laden with water vapor in the evaporation section from said evaporation section to the condensation section and for transferring the carrier gas, after the condensation of water vapor, from said condensation section to said evaporation section, a saline water discharge pipe attached to said evaporation section, and an exit in said condensation section for receiving fresh water.

4. An apparatus according to claim 1, including means for heating the saline water in said heating section, comprising a solar collector.

5. A desalinization apparatus, comprising; a section for elevating the temperature of saline water, a section for heating the saline water that has passed through said temperature elevating section, a section for evaporating the saline water that has passed through said heating section, a section for condensing water vapor, first means for directing the water vapor in said evaporation section to said condensation section together with a carrier gas, second means for directing the carrier gas to said evaporation section after the condensation of water vapor in said condensation section, and means for transferring the heat generated by the condensation of water from said condensation section to at least said evaporation section, wherein the evaporation section and the condensation section are disposed adjacent to each other and are separated by a partition, and the temperature elevating section comprises heat exchanging means and passes through the condensation section and evaporation section alternately, the heat generated in said condensation section by condensation of water vapor being transferred to the saline water in the temperature elevating section to increase its temperature.

6. An apparatus according to claim 5, said first means comprising conduit means connecting said evaporation and condensation sections, and including blower means therein.

7. An apparatus according to claim 5, further including means for forcing carrier gas laden with water vapor in the evaporation section from said evaporation section to the condensation section and for transferring the carrier gas, after the condensation of water vapor, from said condensation section to said evaporation section, a saline water discharge pipe attached to said evaporation section, and an exit in said condensation section for receiving fresh water.

8. An apparatus according to claim 5, including means for heating the saline water in said heating section, comprising a solar collector.

* * * * *